(12) United States Patent
Date (10) Patent No.: US 6,833,860 B1
(45) Date of Patent: Dec. 21, 2004

(54) CAMERA APPARATUS HAVING COMMUNICATING DEVICE AND COMMUNICATING METHOD

(75) Inventor: Hitoshi Date, Kanagawa (JP)

(73) Assignee: Sony Corporation, Tokyo (JP)

( * ) Notice: Subject to any disclaimer, the term of this patent is extended or adjusted under 35 U.S.C. 154(b) by 691 days.

(21) Appl. No.: 09/590,832

(22) Filed: Jun. 9, 2000

(30) Foreign Application Priority Data

Jun. 11, 1999 (JP) .......................................... 11-165070

(51) Int. Cl.[7] .............................................. H04N 5/225
(52) U.S. Cl. ................................ 348/207.1; 348/211.1; 348/552; 386/117
(58) Field of Search .......................... 348/207.1, 207.2, 348/207.99, 705, 159, 552, 14.08, 222.1, 211.1, 211.4; 370/236, 389; 386/117

(56) References Cited

U.S. PATENT DOCUMENTS

| | | | |
|---|---|---|---|
| 5,666,159 A | 9/1997 | Parulski et al. | |
| 6,104,430 A | 8/2000 | Fukuoka | |
| 6,285,660 B1 * | 9/2001 | Ronen | 370/259 |
| 6,337,928 B1 * | 1/2002 | Takahashi et al. | 382/236 |

OTHER PUBLICATIONS

Patent Abstracts of Japan vol. 1996, No. 08, Aug. 30, 1996 & JP 08 098124 A (Ricoh Co. Ltd.) Apr. 12, 1996.

* cited by examiner

Primary Examiner—Tuan Ho
Assistant Examiner—Heather R. Long
(74) Attorney, Agent, or Firm—Frommer Lawrence & Haug LLP; William S. Frommer (57) ABSTRACT

A camera apparatus having a communicating device for transmitting a video signal photographed and processed by a camera or a video signal temporarily recorded in a record medium to a remote location is disclosed, that comprises a connecting means for connecting a plurality of different communication lines, a setting and inputting means for designating one of the plurality of different communication lines and setting a transmission condition, a controlling means for determining whether or not the video signal is transmissible to the remote location with the transmission rate of the designated communication line corresponding to an output signal of the setting and inputting means and generating control information when the video signal is transmissible, and a signal processing means for processing a transmission signal for the designated communication line corresponding to the control information supplied from the controlling means.

6 Claims, 4 Drawing Sheets

CAMERA APPARATUS HAVING COMMUNICATING DEVICE AND COMMUNICATING METHOD

BACKGROUND OF THE INVENTION

1. Field of the Invention

The present invention relates to a camera apparatus having a communicating device that performs a signal process for video data and audio data corresponding to the transmission capacity of a communication line suitable for a signal transmission of news materials and so forth to a broadcasting station and so forth.

2. Description of the Related Art

Data rate of high definition video data of A the current television broadcasting systems (NTSC and PAL systems) is for example 270 Mbps (including a blanking portion). Thus, to transmit video data (and/or audio data) that is output from a camera, a communication line having a sufficient transmission capacity is required. When such a communication line is not used, the video data and audio data should be compressed on the transmitting side. The compressed video data and audio data should be decompressed on the receiving side. Examples of the data compressing standards are motion JPEG (Joint Photographic Expert Group), MPEG (Moving Picture Expert Group), and MPEG-2.

When news materials photographed and recorded by a camera apparatus or the like at site are transmitted to a broadcasting station, a large scale relaying facility using for example a satellite line or a microwave line is required. Alternatively, a record medium on which news materials have been recorded should be removed from the camera and delivered to the broadcasting station.

However, when video data and audio data that are not compressed are transmitted using a communication line, since the line renting fee is expensive, this method is unpractical. Thus, it is difficult to directly transmit raw video data to the broadcasting station. On the other hand, when a record medium is delivered to the broadcasting station, the immediacy and mobility are insufficient. Whenever video data and audio data that are compressed are transmitted, if a transmission line is selected, the compression rate should be changed corresponding to the transmission capacity of the selected transmission line.

OBJECTS AND SUMMARY OF THE INVENTION

An object of the present invention is to provide a camera apparatus having a communicating device that can be connected to a plurality of different communication lines and that can perform a signal process corresponding to the selected communication line and thereby quickly and effectively transmit data.

To solve the above-described problem, a first aspect of the present invention is a camera apparatus having a communicating device for transmitting a video signal photographed and processed by a camera or a video signal temporarily recorded in a record medium to a remote location, comprising a connecting means for connecting a plurality of different communication lines, a setting and inputting means for designating one of the plurality of different communication lines and setting a transmission condition, a controlling means for determining whether or not the video signal is transmissible to the remote location with the transmission rate of the designated communication line corresponding to an output signal of the setting and inputting means and generating control information when the video signal is transmissible, and a signal processing means for processing a transmission signal for the designated communication line corresponding to the control information supplied from the controlling means.

A second aspect of the present invention is a communicating method for transmitting a video signal photographed and processed by a camera or a video signal temporarily recorded in a record medium to a remote location, comprising the steps of (a) connecting a plurality of different communication lines, (b) designating one of the plurality of different communication lines and setting a transmission condition, (c) determining whether or not the video signal is transmissible to the remote location with the transmission rate of the designated communication line corresponding to an output signal that is output at step (b) and generating control information when the video signal is transmissible, and (d) processing a transmission signal for the designated communication line corresponding to the control information supplied at step (c).

According to the present invention, when the transmission condition has been set, the controlling means determines whether or not a desired signal can be transmitted at the transmission rate of a selected communication line. When the controlling means has determined that the desired signal cannot be transmitted, the controlling means generates information of the determined result and supplies it to the displaying means. When the controlling means has determined that the desired signal can be transmitted with a partial change of the transmission condition, the controlling means generates information for prompting the user to change the transmission condition and supplies it to the displaying means. When the controlling means has determined that the desired signal can be transmitted, the controlling means generates information of the determined result and supplies it to the displaying means. When the controlling means has determined that the desired signal can be more effectively transmitted with a partial change of the transmission condition, the controlling portion generates information for prompting the user to change the transmission condition and supplies it to the displaying means. When the controlling means has determined that the desired signal can be transmitted and the user has performed a predetermined operation, the controlling means generates control information for controlling each portion so as to effectively perform the transmitting process corresponding to the transmission capacity of the selected communication line. Thus, the user can easily perform various settings corresponding to the information displayed on the displaying means. In addition, in the real transmitting process, the signal can be quickly and effectively transmitted.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENTS

Figure 1A:
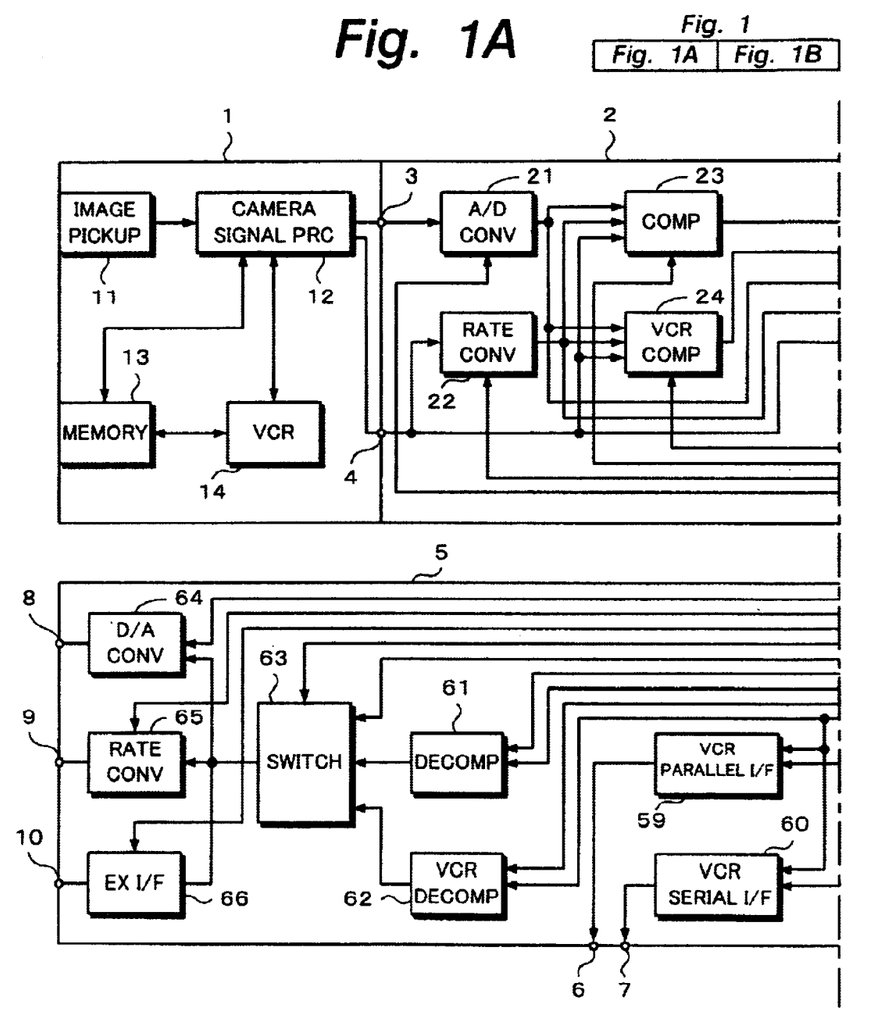
FIG. 1 is a block diagram showing the overall structure of an embodiment of the present invention.
Figure 1B:
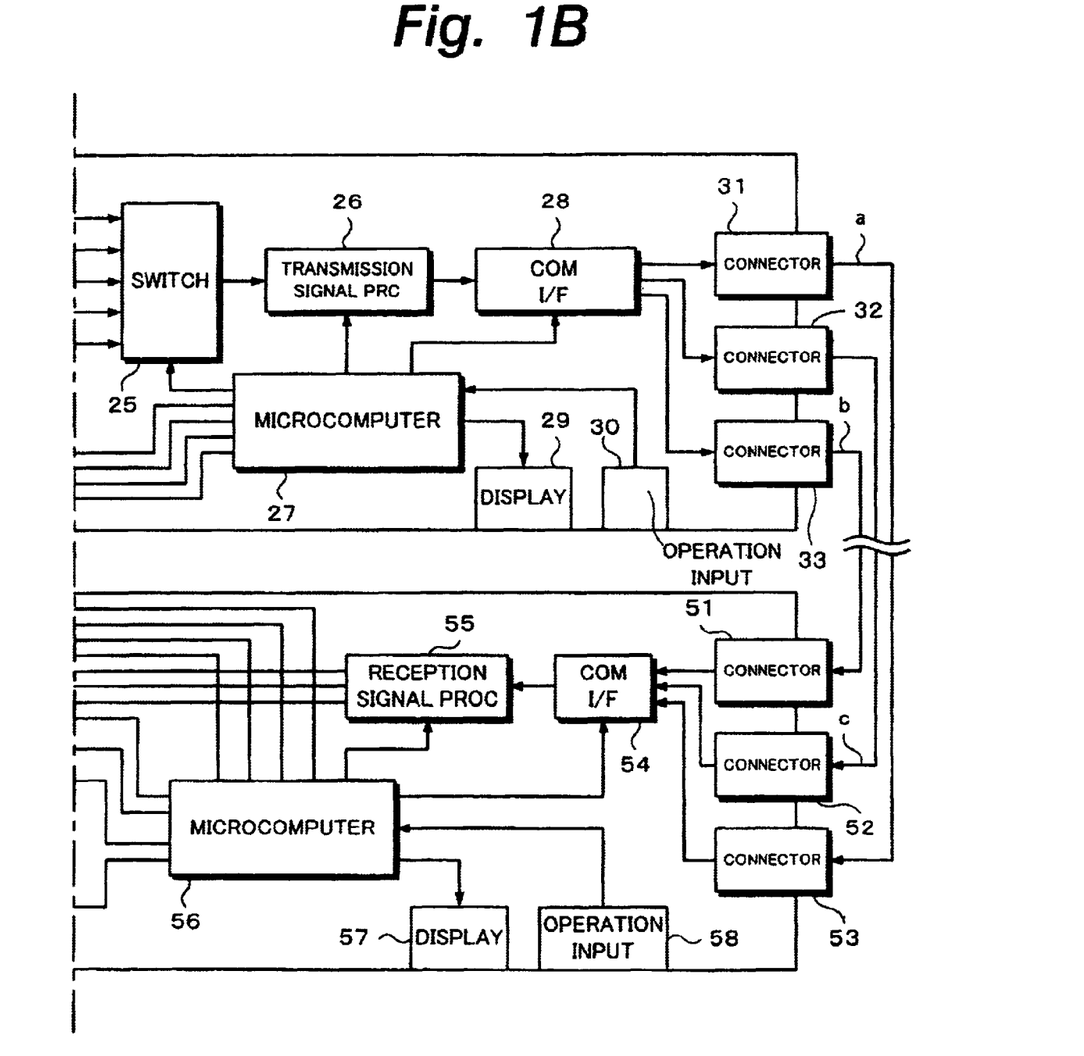

Next, with reference to the accompanying drawings, an embodiment of the present invention will be described. FIG.

1 shows the overall structure of the embodiment of the present invention. As shown in FIG. 1, according to the embodiment of the present invention, a camera portion 1 and a communicating portion 2 are integrated.

The camera portion 1 comprises an image pickup portion 11, a camera signal processing portion 12, a memory 13, and a VCR porion 14. An object image is photographed by the image pickup portion 11. The photographed picture is converted into an electric signal by a CCD (Charge Coupled Device). The image pickup portion 11 generates an image signal corresponding to the electric signal and supplies the image signal to the camera signal processing portion 12.

The camera signal processing portion 12, the memory 13, and the VCR portion 14 are connected through a bus (not shown) so that data can be exchanged thereamong. The camera signal processing portion 12 performs a white balance adjusting process, a contour emphasizing process, and a gamma compensating process for the image signal supplied from the image pickup portion 11, performs a matrix converting process for the image signal, and generates a digital video signal and an analog video signal. When necessary, the camera signal processing portion 12 supplies the digital video signal and the analog video signal to the memory 13 or the VCR portion 14 so as to store or record these signals thereto. The analog video signal generated by the camera signal processing portion 12 or the analog video signal stored in the memory 13 or recorded in the VCR portion 14 is supplied to the communicating portion 2 through a terminal 3. On the other hand, the digital video signal generated by the camera signal processing portion 12 or the digital video signal stored in the memory 13 or recorded in the VCR portion 14 is supplied to the communicating portion 2 through a terminal 4. The camera portion 1 also has an audio signal processing portion (not shown). The audio signal processing portion supplies an analog audio signal to the communicating portion 2 through the terminal 3. On the other hand, the audio signal processing portion supplies a digital audio signal to the communicating portion 2 through the terminal 4.

The communicating portion 2 comprises an A/D converter 21, a rate converter 22, a compressing circuit 23, a VCR compressing circuit 24, a switching circuit 25, a transmission signal processing portion 26, a microcomputer 27, a communication interface 28, a displaying portion 29, an operation inputting portion 30, and three connectors 31, 32, and 33. The analog video (and/or audio) signal supplied through the terminal 3 is supplied to the A/D converter 21. On the other hand, the digital video (and/or audio) signal supplied through the terminal 4 is supplied to the rate converter 22 and the switching circuit 25.

The A/D converter 21 samples the analog video (and/or audio) signal supplied from the camera portion 1, quantizes the sampled signal, and converts the quantized signal into a digital video (and/or audio) signal corresponding to control information supplied from the microcomputer 27. The resultant digital video (and/or audio) signal supplied from the A/D converter 21 is supplied to the compressing circuit 23, the VCR compressing circuit 24, and the switching circuit 25.

The rate converter 22 converts the sampling rate of the digital video (and/or audio) signal supplied from the camera portion 1 to that for the compressing circuit 23 and the VCR compressing circuit 24 corresponding to control information supplied from the microcomputer 27. The resultant digital video (and/or audio) signal with the predetermined sampling frequency supplied from the rate converter 22 is supplied to the compressing circuit 23, the VCR compressing circuit 24, and the switching circuit 25.

The compressing circuit 23 compresses the digital video (and/or audio) signal supplied from the A/D converter 21, the digital video (and/or audio) signal supplied from the rate converter 22, or the digital video (and/or audio) signal supplied from the terminal 4 corresponding to control information supplied from the microcomputer 27 in such a manner that the compression rate is variable. Examples of the compressing process (standards) are motion JPEG. MPEG, and MPEG-2. The compressing circuit 23 generates a first compression signal and supplies it to the switching circuit 25.

The VCR compressing circuit 24 compresses the digital video (and/or audio) signal supplied from the A/D converter 21, the digital video (and/or audio) signal supplied from the rate converter 22, or the digital video (and/or audio) signal supplied from the terminal 4 corresponding to control information supplied from the microcomputer 27 in the same compressing method as a digital VCR used on the receiving side (receiving device). Thus, the VCR compressing circuit 24 can use various compressing methods for conventional VCRs. A second compression signal generated by the VCR compressing circuit 24 is supplied to the switching circuit 25.

The first compression signal generated through the compressing circuit 23, the second compression signal generated through the VCR compressing circuit 24, the digital video (and/or audio) signal supplied from the A/D converter 21, the digital video (and/or audio) signal supplied from the rate converter 22, and the digital video (and/or audio) signal directly supplied from the terminal 4 are supplied to the switching circuit 25. The switching circuit 25 selects one of these digital video (and/or audio) signals corresponding to control information supplied from the microcomputer 27. The signal selected by the switching circuit 25 is supplied as an output signal thereof to the transmission signal processing portion 26.

The transmission signal processing portion 26 comprises a parallel/serial converting circuit, a scrambler, an encoder, and a modulating circuit. The transmission signal processing portion 26 performs an encoding process, a modulating process, and so forth corresponding to control information supplied from the microcomputer 27 in such a manner that these processes comply with the standard of a selected communication path and generates a transmission signal. In reality, the transmission signal processing portion 26 converts a parallel signal supplied from the switching circuit 25 into a serial signal, scrambles the serial signal, encodes the scrambled signal, and modulates the encoded signal. The transmission signal processing portion 26 supplies the generated transmission signal to the communication interface 28.

The communication interface 28 has an output driver and so forth. The communication interface 28 converts the transmission signal supplied from the transmission signal processing portion 26 corresponding to control information supplied from the microcomputer 27 in such a manner that an output waveform of the transmission signal complies with the standard of the selected communication line. The communication interface 28 supplies the converted signal to one of the three connectors 31, 32, and 33 designated by the microcomputer 27. In other words, the communication interface 28 converts the transmission signal into an output signal that complies with the electric specifications of the selected communication line.

The three connectors 31, 32, and 33 comply with mechanical specifications corresponding to the standards of the connected communication lines. The connector 31 is connected to a line a. The connector 32 is connected to a line c. The connector 33 is connected to a line b. Thus, the transmission output signal supplied from the communication interface 28 is transmitted to one of the communication lines a, b, and c through one of the three connectors 31, 32, and 33. Examples of the communication lines are a telephone line, an ISDN line, an ATM line, a public line (such as Internet), and a dedicated line.

The displaying portion 29 and the operation inputting portion 30 are connected to the microcomputer 27 that controls each portion of the communicating portion 2. The operation inputting portion 30 has a plurality of setup switches, a ten key pad, and so forth. When the user operates these setup switches and the ten key pad, the operation inputting portion 30 generates detection information corresponding to the operation state and supplies the detection information to the microcomputer 27. The displaying portion 29 comprises for example an LED, an LCD panel, and a driving circuit. The displaying portion 29 displays various types of information corresponding to information supplied from the microcomputer 27.

The microcomputer 27 has a memory (not shown). The microcomputer 27 monitors the operation state of the operation inputting portion 30 corresponding to the detection information. When necessary, the microcomputer 27 generates information and supplies it to the displaying portion 29. When a transmission condition is set, the microcomputer 27 determines whether or not a desired video (and/or audio) signal can be transmitted with the transmission rate of the selected communication line. When the microcomputer 27 has determined that the desired signal cannot be transmitted, the microcomputer 27 causes the displaying portion 29 to display the determined result. When the microcomputer 27 has determined that the desired signal can be transmitted with a partial change of the transmission condition, the microcomputer 27 prompts the user for the change of the transmission condition. When the microcomputer 27 has determined that the desired signal can be transmitted, the microcomputer 27 causes the displaying portion 29 to display the determined result. When the microcomputer 27 has determined that the desired signal can be more effectively transmitted with a partial change of the transmission condition, the microcomputer 27 prompts the user for a change of the transmission condition. When the user has performed a predetermined operation with the operation inputting portion 30 for starting the transmitting process, the microcomputer 27 reads various types of information from the memory corresponding to the detection information supplied from the operation inputting portion 30, generates control information, and supplies the generated control information to each portion of the communicating portion 2. In other words, the microcomputer 27 centrally controls each portion of the transmission portion 2 so that the transmitting process can be effectively performed corresponding to the transmission capacity of the selected communication line. Before the transmitting process is performed, the memory of the microcomputer 27 has stored setup information such as the transmission rate and error rate of the selected communication line. In addition, the memory has stored various types of information corresponding to the communication standard necessary for performing various determining processes and various types of information necessary for generating information displayed on the displaying portion 29.

In FIG. 1, reference numeral 5 is a receiving device. The receiving device 5 comprises three connectors 51, 52, and 53, a communication interface 54, a reception signal processing portion 55, a microcomputer 56, a displaying portion 57, an operation inputting portion 58, a VCR parallel interface 59, a VCR serial interface 60, a decompressing circuit 61, a VCR decompressing circuit 62, a switching circuit 63, a D/A converter 64, a rate converter 65, and an external interface circuit 66.

The three connectors 51, 52, and 53 comply with mechanical specifications corresponding to standards of connected communication lines. The connector 51 is connected to the line a. The connector 52 is connected to the line c. The connector 53 is connected to the line b. A transmission signal transmitted from the communicating portion 2 is supplied to the communication interface 54 through one of the three connectors 51, 52, and 53.

The communication interface 54 has an input driver and so forth. The communication interface 54 performs an inverse waveform process of the transmitting side for the input transmission signal, converts the communication signal into a reception signal for the reception signal processing portion 55, and supplies the reception signal to the reception signal processing portion 55 corresponding to control information supplied from the microcomputer 56.

The reception signal processing portion 55 comprises a demodulating circuit, a decoder, a descrambler, and a serial/parallel converting circuit. The reception signal processing portion 55 performs a demodulating process and a decoding process for the reception signal processed on the transmitting side corresponding to control information supplied from the microcomputer 56 and generates a first compression signal, a second compression signal, or a digital video (and/or audio) signal. In reality, the reception signal processing portion 55 demodulates the reception signal and then decodes the demodulated signal. Thereafter, the reception signal processing portion 55 descrambles the decoded signal and converts the descrambled signal as a serial signal into a parallel signal. The first compression signal restored by the reception signal processing portion 55 is supplied to the decompressing circuit 61. The second compression signal restored by the reception signal processing portion 55 is supplied to the VCR decompressing circuit 62, the VCR parallel interface 59, and the VCR serial interface 60. The non-compressed digital video (and/or audio) signal restored by the reception signal processing portion 55 is supplied to the switching circuit 63.

The decompressing circuit 61 decompresses the first compression signal supplied from the reception signal processing portion 55 corresponding to control information supplied from the microcomputer 56 in such a manner that the decompressing process complies with the compressing process performed on the transmitting side and outputs a digital video (and/or audio) signal. The digital video (and/or audio) signal decompressed by the decompressing circuit 61 is supplied to the switching circuit 63.

The VCR decompressing circuit 62 decompresses the second compression signal supplied from the reception signal processing portion 55 corresponding to control information supplied from the microcomputer 56 in such a manner that the decompressing process complies with the compressing process performed on the transmitting side and outputs a digital video (and/or audio) signal. The digital video (and/or audio) signal decompressed by the decompressing circuit 62 is supplied to the switching circuit 63.

The digital video (and/or audio) signal is directly supplied from the reception signal processing portion 55 to the switching circuit 63. The digital video (and/or audio) signal is supplied from the decompressing circuit 61 to the switching circuit 63. The digital video (and/or audio) signal is supplied from the VCR decompressing circuit 62 is the switching circuit 63. The switching circuit 63 selects one of the three input signals corresponding to control information supplied from the microcomputer 56. The signal selected by the switching circuit 63 is supplied as an output signal thereof to the D/A converter 64, the rate converter 65, and the external interface circuit 66.

When necessary, the D/A converter 64 converts the digital video (and/or audio) signal supplied from the switching circuit 63 as a digital signal into an analog signal corresponding to control information supplied from the microcomputer 56. The analog video (and/or audio) signal converted by the D/A converter 64 is obtained through an output terminal 8.

When necessary, the rate converter 65 converts the sampling rate of the digital video (and/or audio) signal into that for the signal process of a circuit connected to an output terminal 9 corresponding to control information supplied from the microcomputer 27. The digital video (and/or audio) signal with the sampling frequency converted by the rate converter 22 is obtained through the output terminal 9.

The external interface circuit 66 is a digital interface for transmitting a digital video (and/or audio) signal to an external device. The external interface circuit 66 performs a process corresponding to control information supplied from the microcomputer 56. An output signal of the external circuit 66 is obtained through an output terminal 10 and supplied to an external device.

A first VCR that records a digital video (and/or audio) signal is connected to an output terminal 6. The VCR parallel interface 59 performs an interfacing process for the second compression signal supplied from the reception signal processing portion 55 corresponding to control information supplied from the microcomputer 56. An output signal of the VCR parallel interface 59 is obtained through the output terminal 6 and supplied to the first VCR. A second VCR is connected to an output terminal 7. The VCR serial interface 60 performs an interfacing process for the second compression signal supplied from the reception signal processing portion 55 corresponding to control information supplied from the microcomputer 56. An output signal of the VCR serial interface 60 is obtained through the output terminal 7 and supplied to the second VCR.

The displaying portion 57 and the operation inputting portion 58 are connected to the microcomputer 56 that controls each portion of the receiving device 5. The operation inputting portion 58 has a plurality of setup switches, a ten key pad, and so forth. When the user operates these setup switches and the ten key pad, the operation inputting portion 58 generates detection information corresponding to the operation state and supplies the detection information to the microcomputer 56. The displaying portion 57 comprises for example an LED, an LCD panel, and a driving circuit. The displaying portion 57 displays various types of information corresponding to information supplied from the microcomputer 56.

The microcomputer 56 has a memory (not shown). The microcomputer 56 monitors the operation state of the operation inputting portion 58 corresponding to the detection information. When the user performs a predetermined operation with the operation inputting portion 58, the microcomputer 56 reads various types of information from the memory corresponding to the detection information supplied from the operation inputting portion 58, generates control information for each portion of the receiving device 5, and supplies the generated control information to each portion of the receiving device 5 so that the microcomputer 5 centrally manages each portion of the receiving portion 5. In addition, the microcomputer 56 generates information displayed on the displaying portion 57. The memory of the microcomputer 56 stores various types of information of communication standards.

According to the embodiment of the present invention, the communicating portion 2 has only the transmitting function. When the communicating portion 2 performs a bidirectional communication, the communicating portion 2 has the structure of the receiving device 5 so as to transmit and receive signals.

Next, a transmitting process for transmitting a video (and/or audio) signal according to the embodiment of the present invention will be described. Before the signal is transmitted, one of the communication lines a, b, and c is selected. The selected line is connected to a relevant connector. Thereafter, the user operates the operation inputting portion 30 and input various types of data of the selected communication line. When the transmission capacity of the selected communication line is unknown, the structure of the receiving device 5 may be disposed in the communicating portion 2 so as to transmit and receive signals between the communicating portion 2 and the receiving device 5. Thus, the transmission rate and error rate of the selected communication line will be automatically measured and obtained.

After various types of data of the selected communication line are input, all or part of the following items are input corresponding to information displayed on the displaying portion 29.

(1) A direct transmission mode or an indirect transmission mode is selected. In the direct transmission mode, a signal that is supplied from the image pickup portion 11 is transmitted on real time basis. In the indirect transmission mode, a signal recorded in the VCR 14 or stored in the memory 13 is read and transmitted.

(2) When the indirect transmission mode (for reading a signal from the VCR portion 14 or the memory 13 and transmitting the signal) has been selected, a start point and an end point for transmitting a signal are input.

(3) When the indirect transmission mode (for reading a signal from the VCR portion 14 or the memory 13 and transmitting the signal) has been selected, a transmission time period is input.

(4) When a signal is compressed, a compression method is selected.

(5) The sampling rate of the digital video (and/or audio) signal is designated. The type of the picture signal, the number of frames to be transmitted, and so forth are input.

When the items (1) to (5) have been selected and input, the microcomputer 27 determines whether or not the desired signal can be transmitted with the transmission rate of the selected communication line. When the microcomputer 27 has determined that the desired signal cannot be transmitted, the microcomputer 27 causes the displaying portion 29 to display the determined result. When the microcomputer 27 has determined that the desired signal can be transmitted with a partial change of the transmission condition, the microcomputer 27 prompts the user for the change of the transmission condition. When the microcomputer 27 has determined that the desired signal can be transmitted, the microcomputer 27 causes the displaying portion 29 to display the determined result. When the microcomputer 27 has determined that the desired signal can be more effectively transmitted with a partial change of the transmission condition, the microcomputer 27 prompts the user for a change of the transmission condition. After the user selects and inputs data corresponding to information displayed on the displaying portion 57 and then performs a predetermined operation for starting the transmitting process, the desired signal is transmitted.

When data of the above-described items (1) to (5) is selected and input, the transmitting process can be more effectively performed. In reality, when a signal of a news material is reproduced from a tape and transmitted, a portion that is not used in a broadcast program is designated with a time code and compressed with a high compression rate. A portion that is used in a broadcast program is designated with a time code and compressed with a low compression rate. Thus, a video signal with high quality can be transmitted from the site to the broadcasting station. Thus, the transmission line can be effectively used.

Figure 2A:
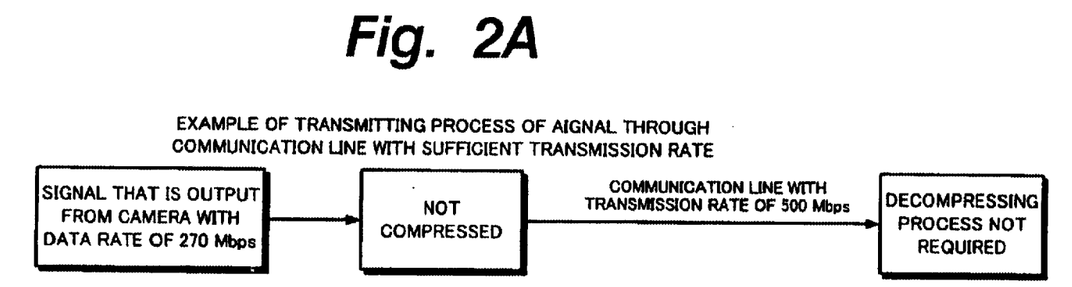
FIGS. 2A, 2B, 2C, and 2D are schematic diagrams for explaining operations of the embodiment of the present invention.

Next, real examples of the transmitting process according to the embodiment of the present invention will be described with reference to FIGS. 2A, 2B, 2C, and 2D. The data rate of high definition video data of the current television broadcasting systems (NTSC and PAL systems) is for example 270 Mbps (including a blanking portion). When a video signal that is output from the image pickup portion of the camera portion 1 is transmitted through a communication line with a transmission rate of 500 Mbps as shown in FIG. 2A, the microcomputer 27 controls each portion of the communicating portion 2 so that the communicating portion 2 transmits a non-compressed signal. Thus, the receiving device 5 does not need to perform the decompressing process for the received signal.

Figure 2B:
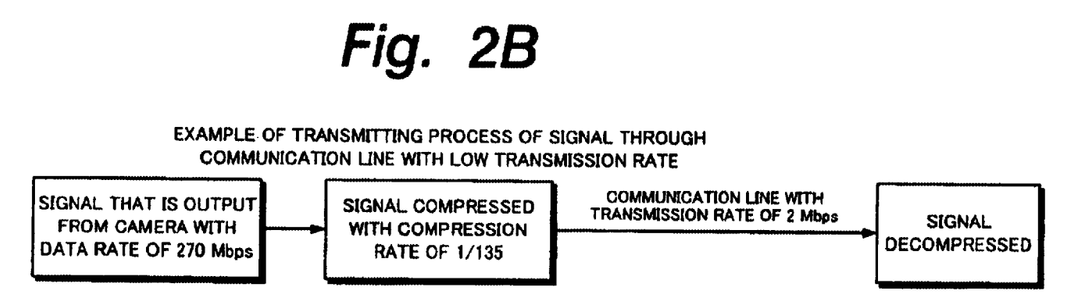

When a video signal that is output from the image pickup portion 1 is transmitted through a communication line with a transmission rate of 2 Mbps as shown in FIG. 2B, the microcomputer 27 controls each portion of the communicating portion 2 so that the communicating portion 2 compresses the video signal with a compression rate of $1/135$. The receiving device 5 performs a decompressing process for the received signal.

Figure 2C:
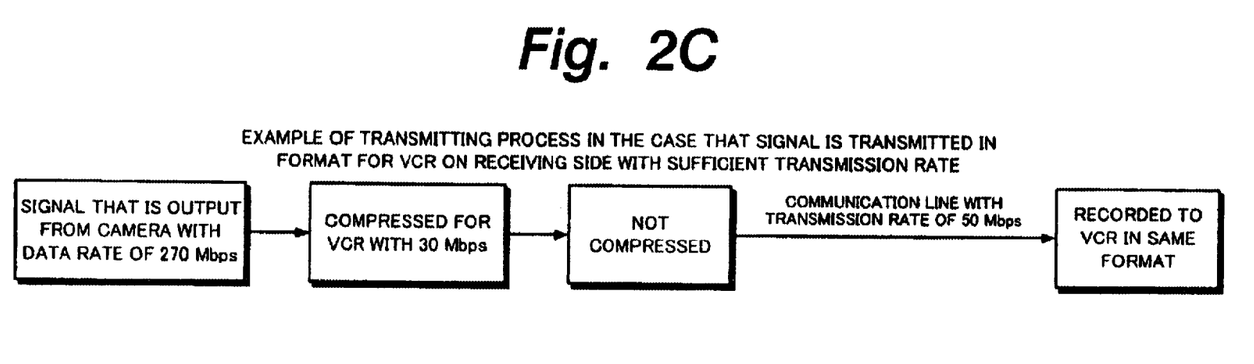

When a VCR is connected to the receiving device 5 as shown in FIG. 2C and a video signal that is output from the image pickup portion of the camera portion 1 is transmitted through a communication line with a transmission rate of 50 Mbps, the microcomputer 27 controls each portion of the communicating portion 2 so that the communicating portion 2 compresses the video signal in a predetermined format for a VCR of the receiving device 5. The VCR of the receiving device 5 records the received signal.

Figure 2D:
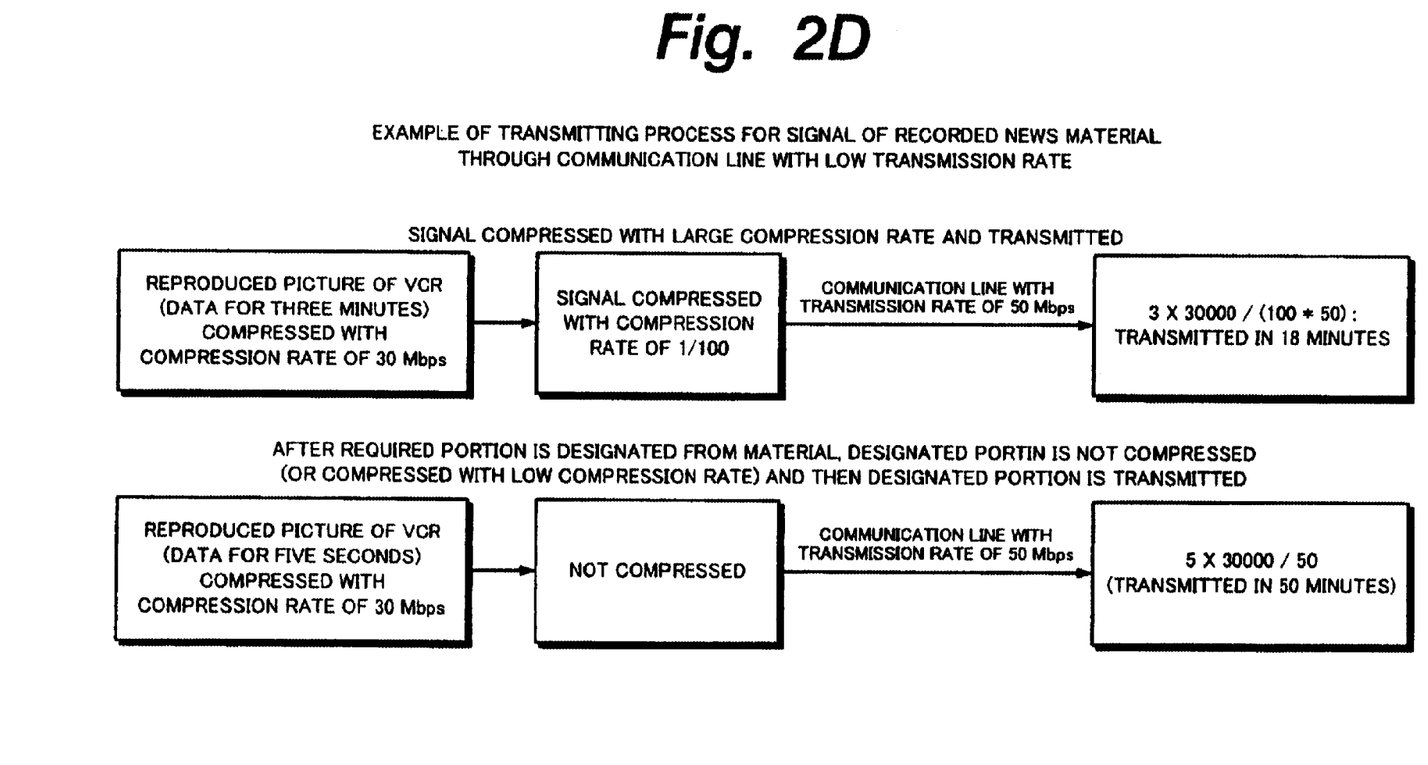

When a video (and/or audio) signal of a news material for three minutes is reproduced from a VCR or the like and transmitted through a communication line with a transmission rate of 50 kbps as shown in FIG. 2D, the video (and/or audio) signal is compressed with a large compression rate and then transmitted. In reality, when the video (and/or audio) signal is reproduced from the VCR, the transmission rate is 30 Mbps. The video (and/or audio) signal is compressed with a compression rate of $1/100$ and transmitted in 18 minutes. A required portion of the video (and/or audio) signal for three minutes is designated. The designated portion is not compressed. The non-compressed signal is transmitted. In reality, when only five seconds of the video (and/or audio) signal for three minutes are designated, data with a transmission rate of 30 Mbps reproduced from the VCR is transmitted in 50 minutes.

According to the present invention, when the transmission condition is set, the controlling means determines whether or not a desired signal can be transmitted with the transmission rate of the selected communication line. The displaying portion displays information corresponding to the determined result. When the transmitting process is actually performed, the controlling means generates control information and supplies each portion of the communicating portion so that each portion effectively performs the transmitting process. Thus, according to the present invention, the user can easily perform various settings with reference to information displayed on the displaying portion. In the real transmitting process, a signal can be quickly and effectively transmitted. In addition, according to the present invention, since communication lines can be effectively used and the compression rate can be partly changed, the cost of the signal transmission can be reduced.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A camera apparatus incorporating a communicating device for transmitting a video signal photographed and processed by a camera or a video signal temporarily recorded in a record medium to a remote location, comprising:

connecting means for connecting a plurality of different communication lines;

setting and inputting means for allowing said user to designate one of the plurality of different communication lines and setting a transmission condition;

controlling means for determining whether or not the video signal is transmissible to the remote location with the transmission rate of the designated communication line corresponding to an output signal of said setting and inputting means;

notifying means for notifying said user if a different communication line would allow the video signal to be transmissible if it is determined that the video signal is not transmissible over the designated communication line;

generating means for generating control information when it is determined that the video signal is transmissible over the designated communication line; and signal processing means for processing a transmission signal to a format compatible with the designated communication line corresponding to the control information supplied from said controlling means.

2. The camera apparatus as set forth in claim 1, further comprising:

displaying means for displaying information corresponding to the determined result of said controlling means.

3. The camera apparatus as set forth in claim 1, further comprising:

data compressing means for compressing the video signal photographed and processed by the camera or the video signal temporarily recorded in the record medium under the control of said controlling means and supplying the compressed video signal to said signal processing means.

4. A communicating method for transmitting a video signal photographed and processed by a camera or a video signal temporarily recorded in a record medium to a remote location, comprising the steps of:

connecting a plurality of different communication lines; allowing said user to designate one of the plurality of different communication lines and setting a transmission condition;

determining whether or not the video signal is transmissible to the remote location with the transmission rate of the designated communication line corresponding to an output signal that is output at the designating step and generating control information when the video signal is transmissible;

notifying said user if a different communication line would allow the video signal to be transmissible if it is determined that the video signal is not transmissible over the designated communication line;

generating control information when it is determined that the video signal is transmissible over the designated communication line; and processing a transmission signal to a format compatible with the designated communication line corresponding to the control information supplied at the determining step.

5. The communicating method as set forth in claim 4, further comprising the step of:

displaying information corresponding to the determined result at the determining step.

6. The communicating method as set forth in claim 4, further comprising the step of:

compressing the video signal photographed and processed by the camera or the video signal temporarily recorded in the record medium under the control at the determining step and supplying the compressed video signal to be processed at the processing step.

* * * * *